United States Patent [19]

Bletz

[11] 4,015,275
[45] Mar. 29, 1977

[54] DIGITAL TIMER FOR A PHOTOGRAPHIC CAMERA SHUTTER

[75] Inventor: Walter Bletz, Braunfels, Germany

[73] Assignee: Ernst Leitz G.m.b.H., Wetzlar, Germany

[22] Filed: Feb. 19, 1975

[21] Appl. No.: 551,136

[30] Foreign Application Priority Data

Feb. 25, 1974 Germany ............................ 2408908

[52] U.S. Cl. ............................... 354/23 D; 354/24; 354/50; 354/60 A
[51] Int. Cl.$^2$ .......................................... G03B 7/08
[58] Field of Search .......... 354/23 D, 50, 51, 60 R, 354/60 A, 24

[56] References Cited

UNITED STATES PATENTS

| 3,824,608 | 7/1974 | Toyoda | 354/50 |
| 3,843,249 | 10/1974 | Kitauva | 354/60 A |

FOREIGN PATENTS OR APPLICATIONS 45-4903  2/1970  Japan ............................. 354/23 D Primary Examiner—Russell E. Adams, Jr.
Attorney, Agent, or Firm—Gilbert L. Wells

[57] ABSTRACT

Digital timers for the electronic control of a camera shutter having a pulse generator and a number of binary dividers each associated with a resistor, the total of these resistors performing a digital to analog conversion and being connected to a common point. The potential of the common point being representative for the number of the binary dividers being in "1" state. A comparator actuating a shutter solenoid when the potential of the common point reaches a predetermined value. All the resistors having the same conductance so that at those times corresponding to powers of 2 (reference timing series) values of potential are formed, which correspond to the logarithm of the time obtained.

4 Claims, 5 Drawing Figures

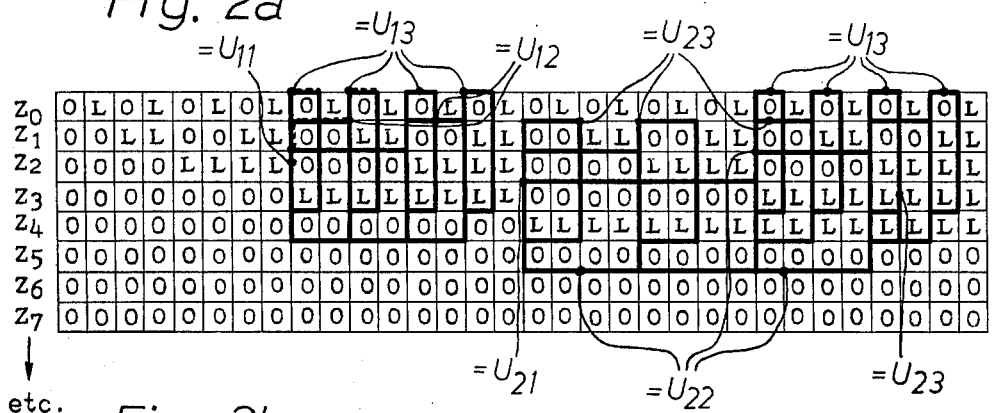

Fig. 2a

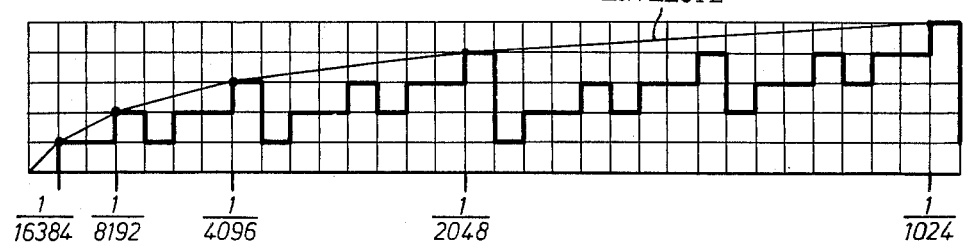

Fig. 2b

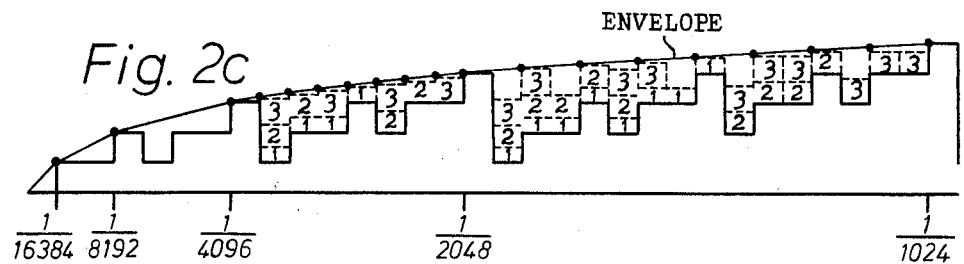

| SWITCHING ON $R_{12} = 0.56$ G WHEN $0_1 \hat{=} L$ | STATES | SWITCHING ON $R_{13} = 0.767$ G WHEN $0_2 \hat{=} L$ | STATES | SWITCHING ON $R_{14} = 0.848$ G WHEN $0_3 \hat{=} L$ | STATES |
|---|---|---|---|---|---|
| $U_{11} =$ | $\begin{cases} z_2 \hat{=} 0 \\ z_3 \hat{=} L \\ z_4 \hat{=} 0 \end{cases}$ | $U_{12} =$ | $\begin{cases} z_1 \hat{=} 0 \\ z_3 \hat{=} L \\ z_4 \hat{=} 0 \end{cases}$ | $U_{13} =$ | $\begin{cases} z_0 \hat{=} 0 \\ z_3 \hat{=} L \end{cases}$ |
| $U_{21} =$ | $\begin{cases} z_3 \hat{=} 0 \\ z_4 \hat{=} L \\ z_5 \hat{=} 0 \end{cases}$ | $U_{22} =$ | $\begin{cases} z_2 \hat{=} 0 \\ z_4 \hat{=} L \\ z_5 \hat{=} 0 \end{cases}$ | $U_{23} =$ | $\begin{cases} z_1 \hat{=} 0 \\ z_4 \hat{=} L \end{cases}$ |
| $U_{31} =$ | $\begin{cases} z_4 \hat{=} 0 \\ z_5 \hat{=} L \\ z_6 \hat{=} 0 \end{cases}$ | $U_{32} =$ | $\begin{cases} z_3 \hat{=} 0 \\ z_5 \hat{=} L \\ z_6 \hat{=} 0 \end{cases}$ | $U_{33} =$ | $\begin{cases} z_2 \hat{=} 0 \\ z_5 \hat{=} L \end{cases}$ |
| ↓ etc. | | ↓ etc. | | ↓ etc. | |

Fig. 2a CONTINUATION
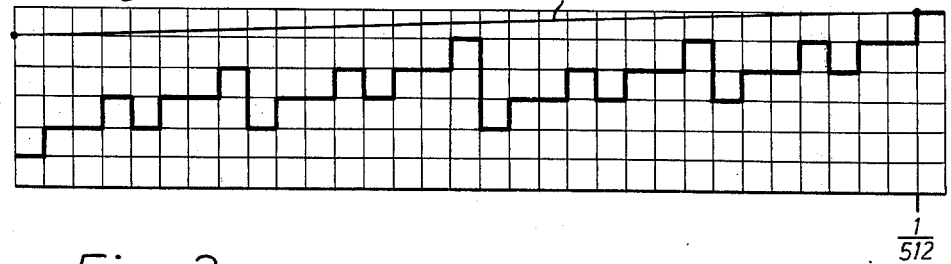
Fig. 2b CONTINUATION
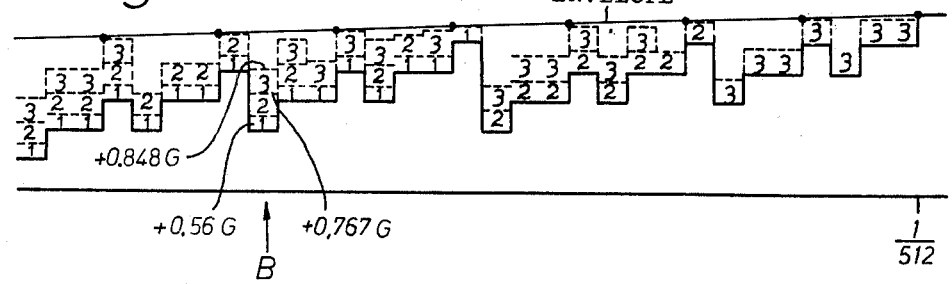
Fig. 2c CONTINUATION

DIGITAL TIMER FOR A PHOTOGRAPHIC CAMERA SHUTTER

CROSS REFERENCES TO RELATED APPLICATIONS

Applicant claims priority under 35 U.S.C. 119 for Application P 24 08 908.5, filed Feb. 25, 1974 in the Paatent Office of the Federal Republic of Germany.

The disclosures of Assignee's copending applications Ser. Nos. 383,295 and 437,142, filed July 16, 1973 and Jan. 28, 1974 respectively, and the references cited therein, namely U.S. Pat. Nos. 3,603,799; 3,646,371; 3,703,130; 3,727,526; 3,742,826; 3,748,979; 3,798,662 and 3,824,608 are incorporated herein to show the state of the art of electronic timers for photographic cameras.

BACKGROUND OF THE INVENTION

The present invention relates to a digital timer for electronic control of a camera shutter.

Applicant incorporates by reference U.S. Pat. Nos. 3,785,264 which discloses the state of the art of camera shutters having electronically controlled delay releasers. The apparatus of the present invention is useful with these shutters.

Electronic control of exposure time of a photographic camera shutter as a function of a logarithmically potential already is known in several embodiments. Thus, it is known how to control the exposure time, i.e., to cause de-logarithmization, by applying a potential similar to the object brightness to a diode, the current passing through the diode charging a condenser to a response threshold. Similarly, a timer is known, which comprises several RC circuit stages, of which the potentials are summed into a total potential as disclosed in W. German Patent Application No. 2,214,734 of Werner Holle, published Oct. 4, 1973. This total potential also reaches a threshold after the time interval to be formed. Again, it is known that diodes occasionally involve an appreciable temperature error which must be compensated for, and that the RC circuits require appreciable efforts as regards balancing or equalization. These circuits operate in an analogue manner.

However, digitally operating timers are also known. In a prior art arrangement of this kind, as disclosed in W. German Patent Application No. 2,328,422 of Takahata Hisatoshi et al, published Jan. 3, 1974, the reference times are obtained whenever a binary reducer or divider is excited. Furthermore, a digitally operating timer already has been proposed, which comprises a memory and a decoder which are hooked up to a set of binary dividers or reducers, so that a signal is emitted upon the desired time interval. The first of these timers, however, requires an additional series of binary dividers or reducers, which set must be controlled during the timing process and the second timer requires a memory and hence an appreciable amount of components. Furthermore, as regards both of these digital timers, the desired time interval must be known before triggering.

SUMMARY OF THE INVENTION

Having in mind the limitation of the prior art, it is an object of the present invention to remedy these drawbacks and produce a digital timer of minimal volume by the use of integrated circuitry techniques, especially of complememtary MOS techniques, and by means of which, on account of further embodiments of the present invention, intermediate time intervals are also obtained in simple manner.

According to the present invention, this object is achieved for digital timers by means of a pulse generator, circuits of a number of binary reducers or dividers each associated with one resistor, all of these dividers counting their extant "1" states and effecting a digital-analogue conversion, a magnet actuated by means of a comparator when the potential formed at the resistors reaches a predetermined value, and the resistors associated with the binary dividers all having the same resistance, so that at those times corresponding to the powers of 2 (standard timing series), there are potentials of such values as correspond to the logarithm of the time (interval) being formed.

Hence the present invention consists of the concept that the mere fact of hooking up all the resistors having the same resistance to the binary dividers, there results a voltage summation or countng of the quasi-analogue potentials at those resistors when counting is undertaken. This voltage counting always increases logarithmically at the reference times of the time (interval) being formed. While these summed potentials assume other values between the reference times, these different values however are always less than the potential occurring at the next reference time. If, however, only the reference times are being considered, then the rise in potential indeed takes place solely logarithmically. An enevelope on or above the potential peaks therefore also shows a purely logarithmic curve.

In order to form all the reference timing from 1 second to 1/2,000 second = 12 timings, 12 binary dividers are required in the circuit. A further embodiment of the present invention, however, provides circuitry requiring only part of these (twelve) binary dividers, the pulse generator feeding these binary dividers after a certain time beng lowered in frequency and the binary dividers that are present becoming doubly effective. Not only does this embodiment save binary dividers proper, but also a corresponding number of resistors.

In a stil further embodiment of the present invention, the novel timer is so constructed by means of additional resistors and logic gate circuits that intermediate timings between the individual reference timings are easily obtained. This represents another advantage of the digital timer of the present invention with respect to the state of the art, the latter's timers being unsuitable to form intermediate timings.

BRIEF DESCRIPTION OF THE DRAWINGS

The drawings show an embodiment of the present invention wherein both the number of binary dividers has been economized by altering the frequency of the pulse generator and additional resistors and logic gates are provided to form intermediate timings, wherein:

FIG. 2a is a table showing the switching states of a few of the lower value binary dividers in the intermediate timing range from 1/16,384 seconds to 1/500 second;

FIG. 2b is a graphical representation showing the associated potential build-up of the summing potential, without considering the additional resistors;

FIG. 2c is a graphical representation showing the associated build-up of the summed potential, taking into account the additional resistors between 1/2,000 second and 1/500 second; and FIG. 3 is a table showing the state of the AND gates for the resistors $R_{12}$, $R_{13}$ and $R_{14}$ when the OR gates indicate 1.

DESCRIPTION OF THE PREFERRED EMBODIMENTS

Figure 1:
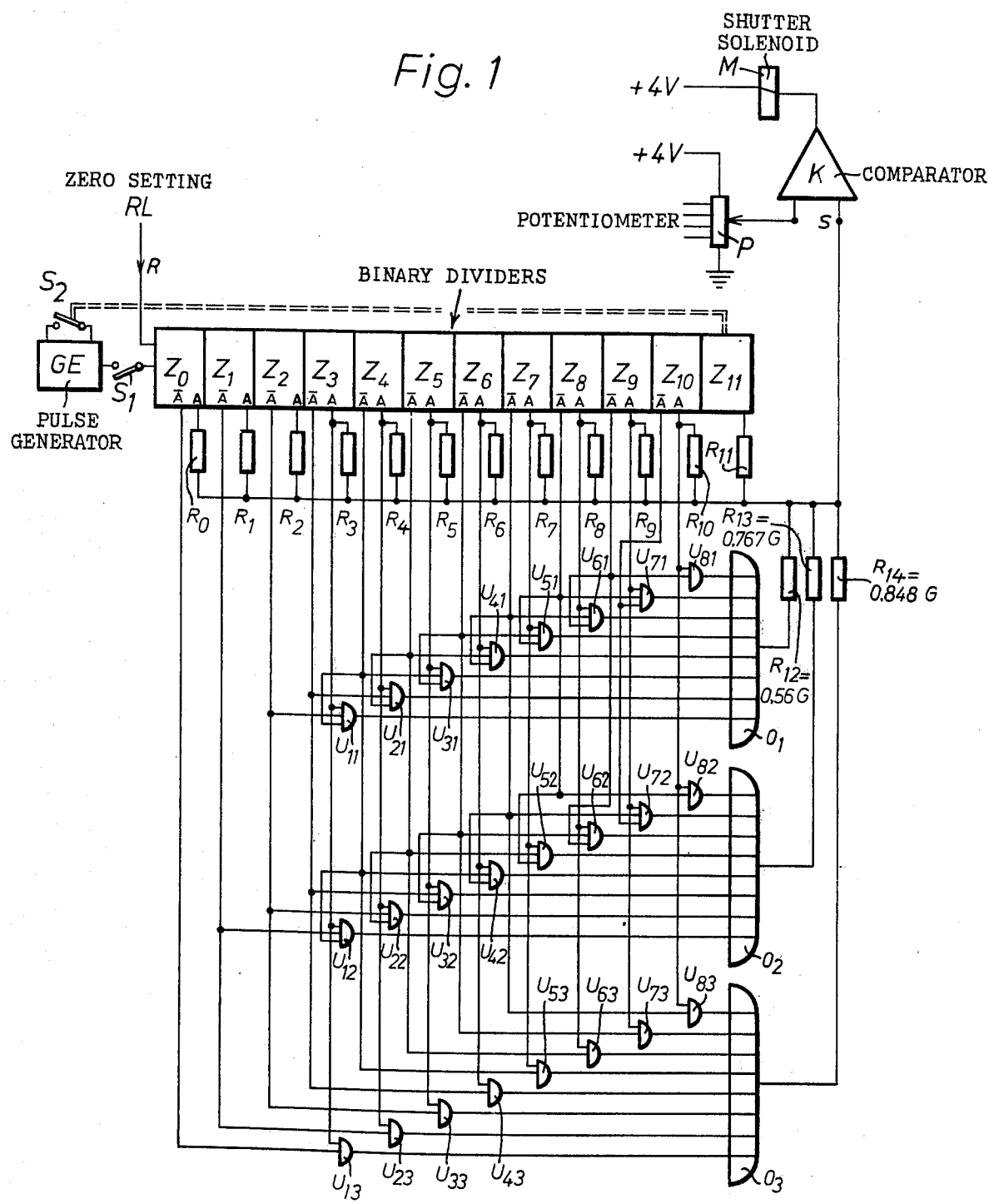
FIG. 1 is the main circuit diagram of the digital timer.

The terms $Z_0$ through $Z_{11}$ in FIG. 1 refer to a series of binary dividers in a circuit. One resistor $R_0$ through $R_{11}$ is hooked up to each of the non-inverted outputs A of binary dividers $Z_0$ through $Z_{11}$, all being of the same conductance G. These resistors therefore are all equal. On the other hand, a resistor $R_{11}$ is connected to the output of binary divider $Z_{11}$, of which the conductance is 8G.

In the side away from the binary dividers, the resistors $R_0$ through $R_{11}$ are all connected together and to a comparator K. The second input of this comparator K is connected to a potentiometer P by means of which a potential is predetermined. A solenoid M is connected at the output tap of comparator K and when actuated, this solenoid triggers the closing process of the shutter. This solenoid is actuated whenever the potential building up on resistors $R_0$ through $R_{11}$ reaches the value of the predetermined potential.

In practice, the potentiometer P is connected to the timing or exposure setting knob of the camera. However, it is equally conceivable that the predetermined potential arises from an illumination detector or exposure meter which, for instance, comprises a photoresistor. A pulse generator GE furthermore is present, which emits 32,768 pulses per second, by means of which the binary dividers are controlled. A switch $S_2$ switches the frequency of this pulse generator when the binary divider has a $Z_{11}$ 1 signal, as further discussed below.

The binary divider circuitry further comprises additional resistors $R_{12}$ of conductance 0.56 G; $R_{13} = 0.767$ G and $R_{14} = 0.848$ G. These three additional resistors are required for forming intermediate timing intervals. The three additional resistors are connected together on one of their sides and to the same input of comparator K where the other resistors are connected. As regards their other side, each of the three resistors is connected individually to the output of an OR gate $O_1$, $O_2$ or $O_3$. The inputs of each OR gate are connected to the outputs of a group of AND gates $U_{11}$ through $U_{81}$, $U_{12}$ through $U_{82}$ and $U_{13}$ through $U_{83}$, the inputs of the latter being connected with the inverted and non-inverted outputs of the binary dividers $Z_0$ through $Z_{10}$ in the manner shown in FIG. 1.

A switch $S_1$ is provided between pulse generator GE and the chain of binary dividers and this switch must be closed when starting the system. It is mechanically connected with the release of the camera. Furthermore, a zero-setting (RL) is provided, by means of which the binary dividers are set to null. The zero-setting pulse passing through this line may be generated as a function of the release activation, for instance by a switch, which is closed in advance of switch $S_1$.

Circuit operation is as follows: the binary dividers $Z_0$ through $Z_{11}$ and the OR gates $O_1$ through $O_3$ are assumed provided with reversing switches at their outputs, so that there is always an unambiguous "0" or "1" potential there, i.e., precisely 0 or +4 volts. It is easily seen that a potential is built up at the input of comparator K, of which the magnitude depends on the states of the counter outputs and of the OR gate outputs. If all outputs are at 0 volt, the potential at the comparator inputs also is 0 volt. If all outputs are at +4 volts, then the potential at the input also is +4 volts.

As the counting by binary dividers $Z_0$ through $Z_{11}$ continues (FIG. 2a shows the counting states), the potential at the input varies between various maxima and minima (FIG. 2b). The duration of these maxima and minima always amounts to a counting period of pulse generator GE. However, as time increases, the maxima rise logarithmically for timings following the series of reference timings. If the potential set at potentiometer P and representing a logarithmic measure of the timing to be formed reaches a maximum, the comparator cuts the current off solenoid M and the camera shutter closes.

Several examples (also see FIGS. 2a and 2b) are presently provided for the build-up potentials. First switch $S_2$ is opened because $Z_{11}$ is still in the null state. In that case, as already mentioned, the frequency of pulse generator GE is 32,768 Hz.

Disregarding at first the AND gates $U_{11}$ through $U_{81}$ and the OR gates $O_1$ through $O_3$, then following $2^4 = 16$ pulses (=16/32768 sec. = 1/2,048 sec.) one obtains the 1 signal in binary dividers $Z_0$ through $Z_3$, all others still being at 0 signal. The potential therefore is $U_1 = 4$ volts $\times 4G/19G$. As the count continues, the potential at first decreases. After $2^5 = 32$ pulses, corresponding to 32/32.768 sec. = 1/1,024 sec., there are however 1 signals at binary dividers $Z_0$ through $Z_4$, so that presently a potential $U_2 = 4$ volts $\times$ 5G/19G is formed. Following $2^{11} = 2,048$ pulses, corresponding to 2,048/32,768 sec. =1/16 sec., there are L signals at binary dividers $Z_0$ through $Z_{10}$, while $Z_{11}$ still has an O signal. The potential now formed is $U_8 = 4$ volts $\times$ 11G/19G. The next pulse from pulse generator GE resets binary dividers $Z_0$ through $Z_{10}$ to zero, and only binary divider $Z_{11}$ has an a1 signal. $Z_{11}$ actuates switch $S_2$. The latter closes and lowers the frequency of pulse generator GE by the factor of $2^7$.

Hence potential $U_9 = 4$ volts $\times 12G/19G$ is obtained after 1/16 sec. + $16 \times 2^7/32,768$ sec. = $1/16 + 2^{11}/2^{15}$ = ⅛ sec. During this time interval, binary dividers $Z_0$ through $Z_{10}$ count by means of the 32,768 hz frequency, are set to 1 up to $Z_{11}$, and the binary dividers $Z_0$ through $Z_3$ count by means of the frequency of $32,768/2^7$ hz.

This shows that the full shutter timing periods arranged in geometric series (timings = time intevals of the standard or reference timing series) are actually formed by means of the present circuit arrangement (envelope in FIG. 2b).

FIG. 2b shows the associated potential build-up for the full timng intervals, i.e., disregarding the effects from the additional resistors $R_{12}$, $R_{13}$ and $R_{14}$.

The intermediate timing intervals are formed by means of those additional resistors $R_{12}$, $R_{13}$ and $R_{14}$, which are switched by the AND or the OR gates. As regards the timing intervals characterized by the states $Z_0Z_1Z_2Z_3Z_4$, 1 1 1 1 0 1/2,048 sec, and, 1 1 1 1 1 =1/1024 sec.

there is first the state 1 1 1 0 1 (see FIG. 2a).

This state is reached after 1.5/2,048 sec.

There is the further state 1 1 0 0 1 after 1 1/4/2,048 sec, and 1 0 0 0 1 after 1.125/2,048 sec.

These states are easily detected by the AND gates $U_{21}$, $U_{22}$ and $U_{23}$. As regards the other intermediate time intervals, the other AND gates are used. Resistors $R_{12}$, $R_{13}$, $R_{14}$ are connected to the outputs of the OR gates $O_1$ through $O_3$ of such fractions of the conductance G that the potentials arising from their effects result in logarithmic values.

By means of a set of three AND gates used for the formation of the intermediate time intervals, seven further intermediate time intervals are detected between two reference times, these intermediate intervals progressing arithmetically, for instance 1 : 1.125: 1.25 : 1.375 sec etc. to 2 seconds. Actually a geometric progression might be desired, e.g.: 1 ; $2^{1/8}$; $2^{2/8}$ seconds to 2 seconds. However, appropriate selection of resistors $R_{12}$ through $R_{14}$ allows approximately the geometric progression by a corrected arithmetic one with an accuracy wholly sufficient in practice in this range. To that end, the resistors are selected, as already mentioned, as $R_{12} = 0.56$ G; $R_{13} = 0.767$ G; and $R_{14} = 0.848$ G.

FIG. 1 indicates that the AND gates $R_{11}$ through $U_{71}$ and also $U_{12}$ through $U_{72}$ each are coupled to the inverted output A of the next higher valued binary divider. This coupling is required to ensure that the potential does not exceed the predetermined potential value ahead of time.

FIG. 2c shows part of the potential curve for the case of the added resistors being switched on. If for instance $Z_2 = O$ and $Z_3 = 1$ and $Z_4 = O$, the AND gate $U_{11}$ is connected to resistor $R_{12}$ of 0.56 G. The basic curve of the potential in this range therefore must be raised by 0.56 G. Similarly $R_{13}$ of 0.767 G is switched on if $Z_1 = O$, $Z_3 = 1$ and $Z_4 = O$. These 0.767 G therefore also are added to the potential. This function is observed for all the gates in the manner illustrated in FIG. 2c from 1/4,096 to 1/512 sec.

As regards the 9th pulse following 1/1,024 sec., i.e. at 1.27 msec, an example as tabulated in FIG. 3 is discussed in detail. This time is denoted by arrow B in FIG. 2c. At that time, there are the following states for binary dividers $Z_0$ through $Z_7$ (the higher valued ones may be neglected in this instance because they are all in the O-state

| $Z_0 Z_1 Z_2 Z_3 Z_4 Z_5 Z_6 Z_7$ |
|---|
| O O O 1 O 1 O O |

Because of this combination of states, there are L signals at the output of the following AND gates: $U_{11}$, $U_{12}$, $U_{13}$, $U_{31}$ and $U_{33}$.

| | | | |
|---|---|---|---|
| $U_{11}$ switches for | | O1O | $\Delta O_1 = 1$ |
| $U_{12}$ switches for | O | 1O | $\Delta O_1 = 1$ |
| $U_{13}$ switches for | 0 | 1 | $\Delta O_2 = 1$ |
| $U_{31}$ switches for | | O1O | $\Delta O_1 = 1$ |
| $I_{33}$ switches for | O | 1 | $\Delta O_3 = 1$ |

In this instance the OR gates $O_1$ and $O_3$ are always controlled from two AND gates, i.e. OR gate $O_1$ by AND gates $U_{11}$ and $U_{31}$, and OR gate $O_3$ by AND gates $U_{13}$ and $U_{33}$. Nevertheless, resistors $R_{12}$ and $R_{14}$ are obviously switched on only once, so that the three resistors $R_{12}$ through $R_{14}$ produce a total conductance of $0.56$ G $+ 0.767$ G $+ 0.848$ G $= 2.175$ G for $+4$ volts, so that the potential also rises by this amount above the base potential, as would be obtained from FIG. 2b if one were to neglect resistors $R_{12}$ through $R_{14}$.

FIG. 2c indicates by means of numbers (1,2,3) in the dashed ranges above the base potentials which of the OR gates ($O_1, O_2, O_3$) shows an al signal, i.e., which of the resistors $R_{12}$, $R_{13}$, $R_{14}$ is switched for $+4$ volts.

I claim:

1. A digital timer circuit for the electric control of a camera shutter, comprising:
   a. a pulse generator;
   b. a sequence of binary dividers ($Z_0$–$Z_{10}$) connected with said pulse generator;
   c. a resistor ($R_0$–$R_{10}$) connected to each of said binary dividers, each of said resistors having the same conductance and all resistors together performing a digital to analog conversion;
   d. a comparator having a first input and a second input; all resistors ($R_0$–$R_{11}$) being connected to said first input, the electrical potential of which corresponds to the number of said binary dividers having "1" state, and thus corresponding to the logarithm of the shutter time to be obtained, which shutter times differ from one another by powers of 2 in the reference timing series;
   e. means for generating a predetermined electrical potential, said means being connected to said second comparator input; and
   f. a solenoid connected to the output of said comparator, said solenoid actuating said camera shutter when said comparator output carries a signal as a consequence of the potential of said first comparator input reaching said predetermined potential of said second comparator input.

2. The digital timer circuit of claim 1 further comprising each of said binary dividers having besides said resistor output a true output and an inverted output; a plurality of logic AND gates ($U_{11} - U_{81}$; $U_{12} - U_{82}$; $U_{13} - U_{83}$) connected in series to said true and inverted binary divider outputs, a plurality of logic OR gates ($O_1, O_2, O_3$) connected in series to the outputs of said logic AND gates, and a plurality of additional resistors ($R_{12}, R_{13}, R_{14}$) connected in series between the output of said logic OR gates and said common point, said additional resistors being switched by said logic gates corresponding to the state of said binary dividers.

3. The digital timer circuit of claim 2, wherein said additional resistors have conductances of 0.5 G, 0.767 G and 0.848 G respectively.

4. A digital timer circuit for the electric control of a camera shutter, comprising:
   a. a pulse generator;
   b. a number of binary dividers and resistors, each binary divider having a true and a complement output;
   c. a resistor being connected to the true output of each nth binary divider, said resistor having a conductance of $1/n-1$ times the conductance of said resistors connected to said binary dividers;
   d. means connecting said nth binary divider to said pulse generator for reducing the frequency of said pulse generator by a factor $2^{n-1}$ when said nth binary divider is in "1" state;
   e. a first group of logic AND gates ($U_{13} - U_{83}$) of which the inputs of the first AND gate ($U_{13}$) are connected to the complement output of the first binary divider ($Z_0$) and to the true output of the fourth binary divider ($Z_3$) ad seriatim; and the inputs of the last AND gate are connected to the complement output of the $n-4$ binary divider and to the true outpu of the $n-1$ binary divider;

f. a second group of logic AND gates ($U_{12} - U_{82}$) of which the inputs of the first AND gate ($U_{12}$) are connected to the true output of the fourth binary divider ($Z_3$) and to the complement outputs of the second binary divider ($Z_1$) and the fifth binary divider ($Z_4$) ad seriatim, and the inputs of the last but one AND gate are connected to the true output of the $n-2$ binary divider and to the complement outputs of the $n-1$ binary divider and the $n-4$ binary divider; and the inputs of the last AND gate are connected to the true output of the $n-1$ binary divider and to the complement output of the $n-3$ binary divider;

g. a third group of logic AND gates ($U_{11} - U_{81}$) of which the inputs of the first AND gate ($U_{11}$) are connected to the true output of the fourth binary divider ($Z_3$) and to the complement outputs of the third binary divider ($Z_2$) and the fifth binary divider ($Z_4$) ad seriatim, and the next to the last AND gate is connected to the true output of the $n-2$ binary divider and to the complement outputs of the $n-1$ binary divider and the $n-3$ binary divider, and the last AND gate is connected to the true outputs of the $n-1$ binary divider and to the complement output of the $n-2$ binary divider;

h. a first logic OR gate to which the outputs of the first group of logic AND gates are connected;

i. a second logic OR gate to which the outputs of the second group of logic AND gates are connected;

j. a third logic OR gate to which the outputs of the third group of logic AND gates are connected;

k. a first additional resistor connected between said first logic OR gate and said first comparator input, said first additional resistor having a conductance of 0.848 times the conductance of said resistors connected to said binary dividers;

l. a second additional resistor connected between said second logic OR gate and said first comparator input, said second additional resistor having a conductance of 0.767 times the conductance of said resistors connected to said binary dividers;

m. a third additional resistor connected between said third logic OR gate and said first comparator input, said third additional resistor having a conductance of 0.56 times the conductance of said resistors connected to said binary dividers;

n. a comparator having a first input and a second input; said network of logic AND gates and OR gates and additional resistors being adapted to generate electric potentials at the first input of said comparator corresponding to the logarithm of intermediate shutter times in the reference timing series;

o. means for generating a predetermined electrical potential, said means being connected to said second comparator input; and p. a solenoid connected to the output of said comparator, said solenoid actuating said camera shutter when said comparator output carries a signal as a consequence of the potential of said first comparator inpt reaching said predetermined potential of said second comparator input.

* * * * *